(12) United States Patent
Bryant et al.

(10) Patent No.: US 8,991,529 B2
(45) Date of Patent: Mar. 31, 2015

(54) SELF-MOTIVATED CARGO POD

(71) Applicant: GM Global Technology Operations LLC, Detroit, MI (US)

(72) Inventors: Wade W. Bryant, Grosse Pointe Farms, MI (US); Gael Buzyn, Pacific Palisades, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/746,164

(22) Filed: Jan. 21, 2013

(65) Prior Publication Data

US 2014/0202779 A1      Jul. 24, 2014

(51) Int. Cl.
*B62D 51/04* (2006.01)
(52) U.S. Cl.
CPC ..................................... *B62D 51/04* (2013.01)
USPC ........................................................ 180/19.2

(58) Field of Classification Search
CPC .. B62B 5/0026; B62B 5/0033; B62B 5/0079; B62B 5/0036; B62B 5/004; B62B 5/0046
USPC ............................. 180/19.2, 19.3, 14.2, 19.1
See application file for complete search history.

(56) References Cited

U.S. PATENT DOCUMENTS

| | | | | |
|---|---|---|---|---|
| 2,553,549 A * | 5/1951 | Carter | ........................... | 122/137 |
| 3,281,186 A * | 10/1966 | Davis | ............................... | 298/2 |
| 3,557,893 A * | 1/1971 | Kohls | ........................... | 180/332 |
| 4,113,042 A * | 9/1978 | Vaill | ............................ | 180/19.3 |
| 4,716,980 A * | 1/1988 | Butler | .......................... | 180/19.2 |
| 5,522,471 A * | 6/1996 | Hilgendorf | ..................... | 180/208 |
| 7,017,689 B2 * | 3/2006 | Gilliland et al. | ............. | 180/19.1 |
| 7,210,545 B1 * | 5/2007 | Waid | ............................ | 180/65.1 |
| 7,314,116 B2 * | 1/2008 | David et al. | ................... | 187/231 |
| 2003/0085064 A1 * | 5/2003 | Turner | ......................... | 180/65.5 |
| 2010/0123294 A1 * | 5/2010 | Ellington et al. | ........ | 280/47.371 |

* cited by examiner

*Primary Examiner* — Tony Winner
(74) *Attorney, Agent, or Firm* — BrooksGroup

(57) ABSTRACT

One variation may include a module including a body and a control arm; the control arm being constructed and arranged to allow a user to direct, steer, or move the module in a plurality of modes.

18 Claims, 3 Drawing Sheets

SELF-MOTIVATED CARGO POD

TECHNICAL FIELD

The field to which this disclosure generally relates includes freight and cargo transportation.

BACKGROUND

Freight and cargo transportation methods commonly desire simplified methods and apparatus', ease of mobility, and expedited deployment.

SUMMARY OF ILLUSTRATIVE VARIATIONS OF THE INVENTIONS

One variation may provide a module that may include a cavity and a plurality of wheels. The module may be constructed and arranged to aid in the transportation and delivery of cargo or freight.

One variation may include a module including a body and a control arm; the control arm being constructed and arranged to allow a user to direct, steer, or move the module in a plurality of modes.

One variation may provide a module; the module may include a body, a cavity, at least one door, a control arm, a hitch, a platform, a motor, a battery, and a plurality of wheels. The module may be constructed and arranged to facilitate the transportation and delivery of cargo or freight whereby the control arm may be constructed and arranged to aid a user in guiding or directing the module and the motor may power rotation of the wheels.

One variation may provide a module that may include a control arm; the control arm may be constructed and arranged to allow a user to direct, steer, or move the module in a plurality of modes.

Other standard variations will become apparent from the detailed description provided hereinafter. It should be understood that the detailed description and enumerated variations merely disclose standard variations of the inventions and are intended for purposes of illustration only and are not intended to limit the scope of the inventions.

BRIEF DESCRIPTION OF THE DRAWINGS

Standard variations will become more fully understood from the detailed description and the accompanying drawings, wherein.

DETAILED DESCRIPTION OF STANDARD VARIATIONS

The following description of variants is only illustrative of components, elements, acts, products, and methods considered to be within the scope of the inventions and are not in any way intended to limit such scope by what is specifically disclosed or not expressly set forth. The components, elements, acts, products, and methods as described herein may be combined and rearranged other than as expressly described herein and still are considered to be within the scope of the inventions. One of ordinary skill in the art will appreciate that the disclosed variations may have various geometric, dimensional, and structural configurations and no single variation should be considered preferential.

Figure 1:
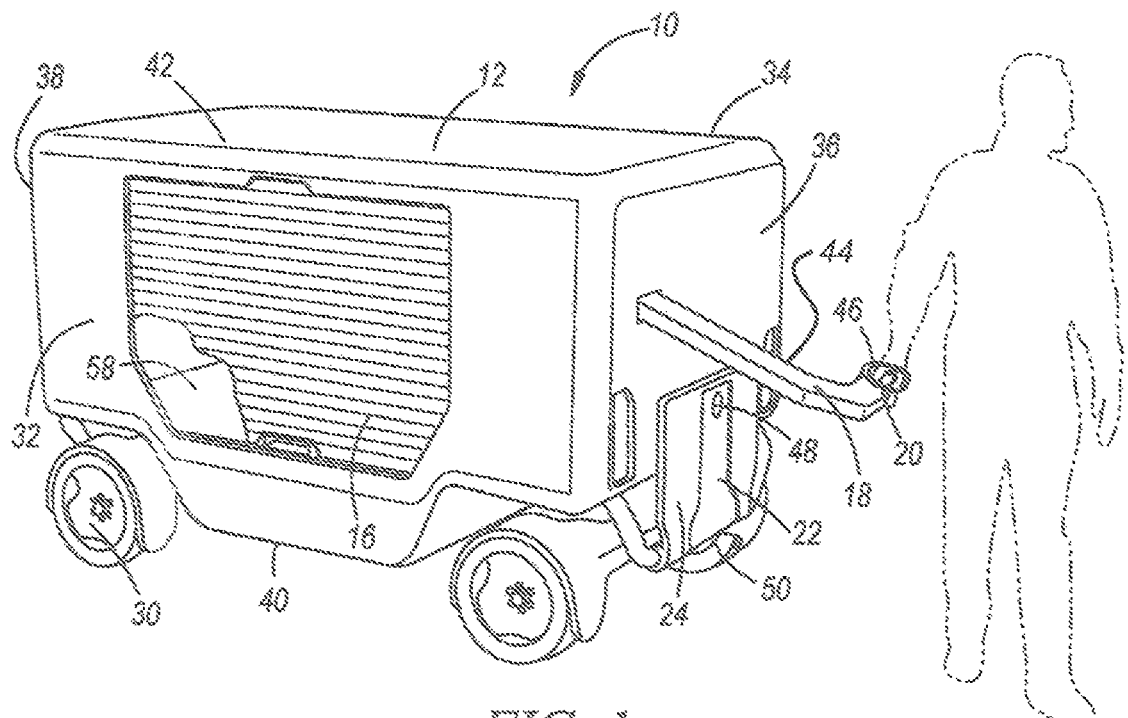
FIG. 1 is a perspective view of a product according a number of variations.

Referring to FIG. 1; one variation may provide a module 10 that may have a body 12, at least one cavity 58 a door 16, a control arm 18, a hitch 22, a platform 24, a motor (not shown), a battery (not shown) and a plurality of wheels 30. The control arm 18 may include a control means 20 constructed and arranged to assist a user in directing, steering, or moving the module. According to one variation, the module may be operated in a hand-led mode of operation whereby a user may use the control arm 18 and control means 20 to direct, steer, or move the module 10.

Figure 2:
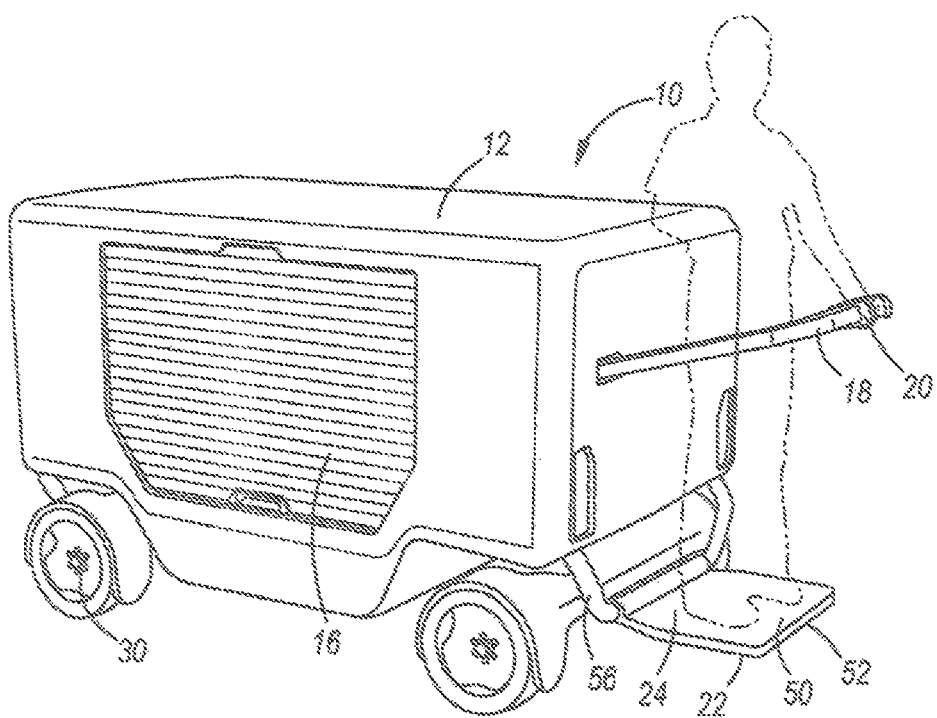
FIG. 2 is a perspective view of a product according to a number of variations.

Referring to FIG. 2; one variation may provide a module 10 that may have a body 12, at least one cavity (not shown), a door 16, a control arm 18, a hitch 22, a platform 24, a motor (not shown), a battery (not shown) and a plurality of wheels 30. The control arm 18 may include a control means 20 constructed and arranged to assist a user in directing, steering, or moving the module. According to one variation, the module may be operated in a driving mode of operation whereby a user may stand on the platform 24, the platform 24 being constructed and arranged to extend from the body 12 and allow a user to stand on the platform 24, and where the user may use the control arm 18 and control means 20 to direct, steer, or move the module 10. In one variation, a motor 25 and a battery 27 may be constructed and arranged to power one or more wheels 30 by way od an electronic controller system 31.

The controller system 31 may include a main controller and/or a control subsystem may include one or more controllers (not separately shown) in communication with one or more motors 25, and handle controller 20 and any sensors for receiving and processing sensor input and transmitting output signals. The controller(s) may include one or more suitable processors and memory devices (not separately shown). The memory may be configured to provide storage of data and instructions that provide at least some of the functionality of the engine system and that may be executed by the processor(s). At least portions of the method may be enabled by one or more computer programs and various system data or instructions stored in memory as look-up tables, formulas, algorithms, maps, models, or the like. The control subsystem may control system parameters by receiving input signals from the sensors, executing instructions or algorithms in light of sensor input signals, and transmitting suitable output signals to the various motors 25 or module components. As used herein, the term "model" may include any construct that represents something using variables, such as a look up table, map, formula, algorithm and/or the like. Models may be application specific and particular to the exact design and performance specifications of any given system.

Although the term "step" is used herein, such is not intended to limit the invention to the specific components, elements or acts described herein.

Figure 3:
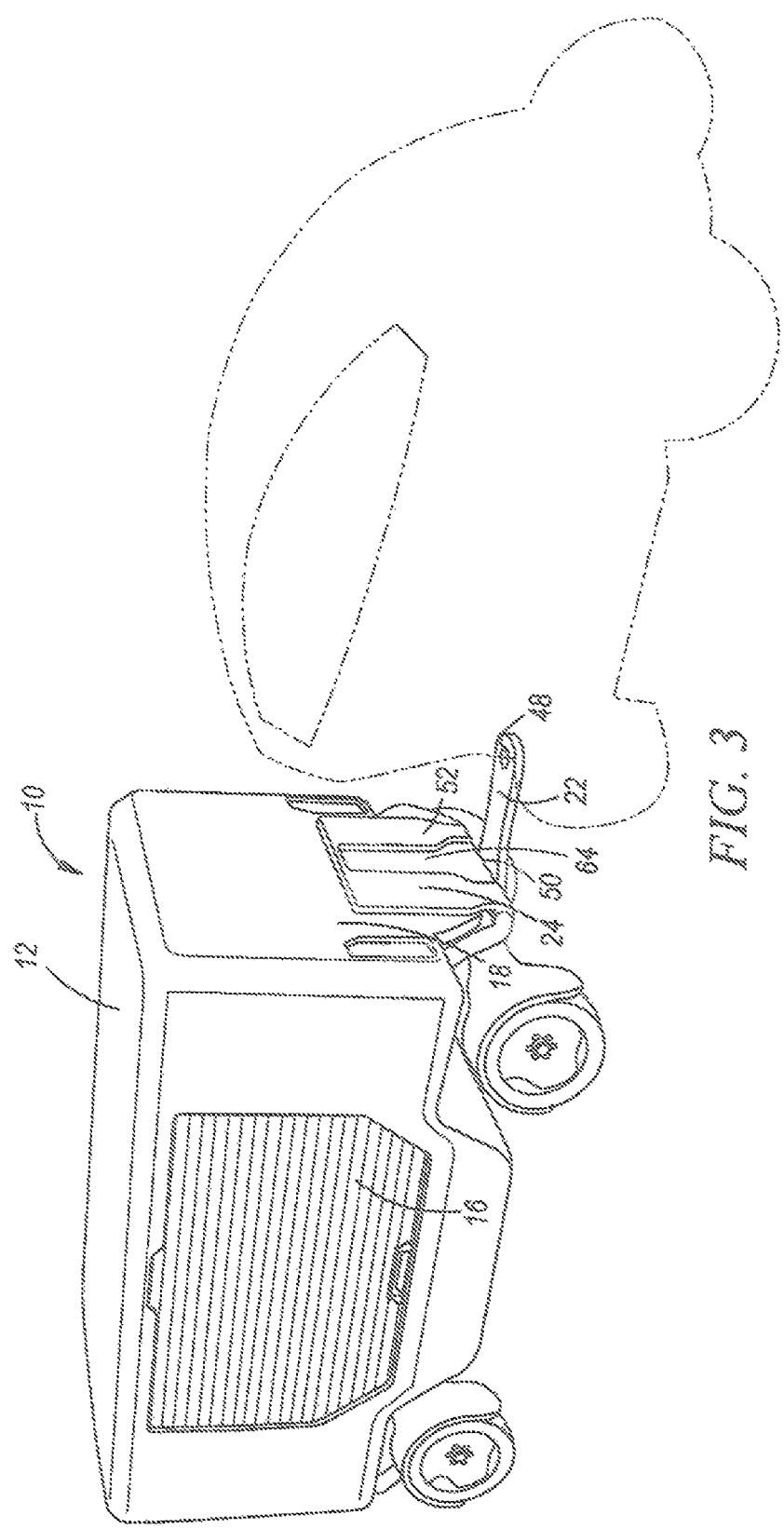
FIG. 3 is a perspective view of a product according to a number of variations.

Referring to FIG. 3; one variation may provide a module 10 that may have a body 12, at least one cavity (not shown), a door 16, a control arm 18, a hitch 22, a platform 24, a motor (not shown), a battery (not shown) and a plurality of wheels 30. The control arm 18 may include a control means 20 constructed and arranged to assist a user in directing, steering, or moving the module. According to one variation, the module 10 may be operated in a trailer mode of operation whereby a user may use the hitch 22 to attach the module 10 to a vehicle such as an automobile, and where the vehicle may tow the module 10.

Figure 4:
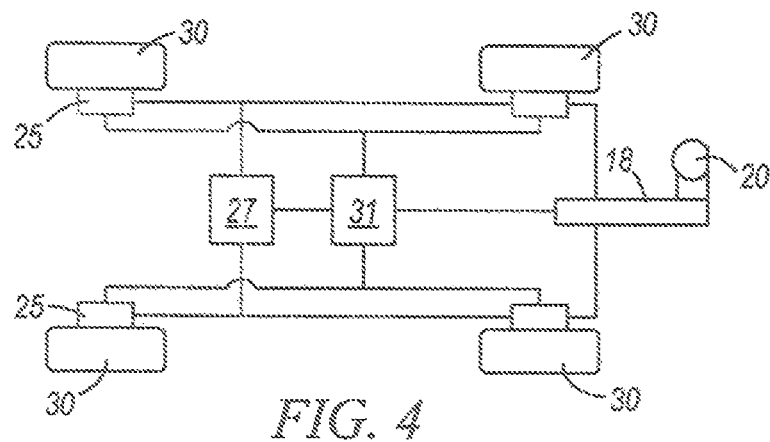
FIG. 4 is a schematic view of a product according to a number of variations.

Referring to FIG. 4; one variation may include a controller system 31 that may include a main controller and/or a control subsystem that may include one or more controllers (not separately shown) in communication with one or more motors 25, a battery 27, and control means 20 and any sensors for receiving and processing sensor input and transmitting output signals. The controller system 31 may communicate and control the battery 27, the one or more motors 25, and the plurality of wheels 30 via the control means 20.

Figure 5:
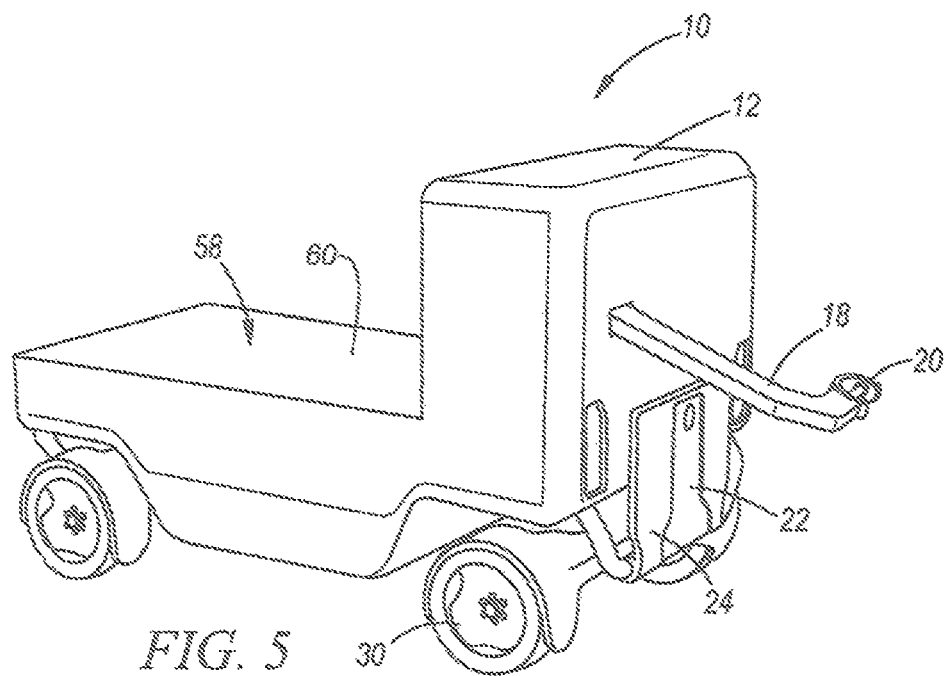
FIG. 5 is a perspective view of a product according to a number of variations.

Referring to FIG. 5; one variation may provide a module 10 that may have a body 12, at least one cargo space 58, a control arm 18, a hitch 22, a platform 24, a motor (not shown), a battery (not shown) and a plurality of wheels 30. The control arm 18 may include a control means 20 constructed and arranged to assist a user in directing, steering, or moving the module. According to one variation, the cargo space 58 may have an open cargo bed construction arranged to hold cargo or freight.

The body 12 may include a first side wall 32, a second side wall 34, a front wall 36, a rear wall 38, a floor 40, and a roof 42 connected together and defining at least one cargo space or cavity 58. The body may be made of any suitable material used in the containment and transportation of cargo and freight. Suitable materials may include, but are not limited to, metals, polymers, ceramics, or composite materials. The body may be of any geometry or shape suitable for the containment and transportation of cargo and freight. In one variation, a door 16 may be located on the first side wall 32, the second side wall 34, the front wall 36, the rear wall 38, or the roof 42. The door 16 may be constructed and arranged to allow access to the cavity within the body 12. In another variation, the first side wall 32, the second side wall 34, the front wall 36, the rear wall 38, the floor 40, and the roof 42 may be connected together and defining at least one open cargo space 58 or bed 60. In another variation, the first side wall 32, the second side wall 34, the front wall 36, the rear wall 38, and the floor 40 may be connected together and defining at least one open cargo space or bed. The bed may be of any geometry or shape suitable for the containment and transportation of cargo and freight and may constructed and arranged to allow a user to add or remove cargo or freight from the bed.

The control arm 18 may be attached to and extend from the first side wall, the second side wall, the front wall, the rear wall, the floor, or the roof of the body. The control arm 18 may include a hinge that may be constructed and arranged to allow the control arm to extend from or abut the first side wall, the second side wall, the front wall, the rear wall, the floor, or the roof of the body. The control may include an arm portion 44 and a handle portion 46, the handle portion may include a control means 20. The control means 20 may be constructed and arranged to drive a motor, battery, and a plurality of wheels whereby when a user utilizes the controls means 20 the user may be able to pilot the module 10. The control means 20 may be of a cylindrical shape and may be constructed and arranged so that rotation of the control means 20 about its longitudinal axis may drive the module 10 forward or back and rotation of the control means about a polar axis may direct the module 10 to the left or right.

The hitch 22 may be attached to and extend from the first side wall, the second side wall, the front wall, the rear wall, the floor, or the roof of the body. The hitch 22 may include a hinge 50 that may be constructed and arranged to allow the hitch to extend from or abut the first side wall, the second side wall, the front wall, the rear wall, the floor, the platform, or the roof of the body. The hitch 22 may define a through-hole 48 constructed and arranged to engage a hitch ball of a vehicle whereby when the hitch ball of the vehicle engages the through-hole 48, the module 10 may be towed by a vehicle.

The platform 24 may be attached to and extend from the first side wall, the second side wall, the front wall, the rear wall, the floor, or the roof of the body. The platform 24 may include a hinge 56 that may be constructed and arranged to allow the platform to extend from or abut the first side wall, the second side wall, the front wall, the rear wall, the floor, or the roof of the body. The platform 24 may include a first surface 50, a second surface 52, and an indentation 54. In one variation, the platform 24 may extend from the first side wall, the second side wall, the front wall, the rear wall, or the roof of the body; and the first surface 50 may be parallel to the ground and constructed and arranged to allow a user to stand on the first surface 50 and be within reaching distance of the control arm 18 and control means 20. The second surface 52 may include an indentation 54 constructed and arranged to allow the hitch 22 to reside within the indentation 54 when the platform 24 is extended or abutting the first side wall, the second side wall, the front wall, the rear wall, or the roof of the body.

The motor may be integrated with the plurality of wheels and may be constructed and arranged to drive the plurality of wheels. The battery may be integrated with the motor and may be constructed and arranged to drive the motor. The battery may be within the first side wall, the second side wall, the front wall, the rear wall, or the roof of the body or may be located within the cavity or externally on the module. The motor, battery, and plurality of wheels may be constructed and arranged to interface with the control means whereby a user may use the control means to drive, steer, or otherwise move the module.

The plurality of wheels 30 may be attached to and extend from the first side wall, the second side wall, the front wall, the rear wall, or the floor of the body. The plurality of wheels 30 may be constructed and arranged to interface with the motor, battery, and control means to form a complete drivetrain system. The plurality of wheels 30 may be constructed and arranged to assist a user in driving, steering, or otherwise moving the module.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

According to first variation, the module may include a body and a plurality of wheels. The body may include at least one cavity suitable for storing cargo or freight and a control arm. The control arm may allow a user to direct, steer, or drive the module over a variety of terrain or surfaces. The control arm may facilitate the ease of mobility and navigability of the module.

A second variation may include a module as set forth in the first variation wherein the body may include a motor and a battery that may power or drive the plurality of wheels.

A third variation may include module as set forth in the first or second variations wherein the control arm may be integrated with the motor, the battery, and the plurality of wheels such that the control arm may control the degree to which the motor and battery power or drive the plurality of wheels.

A fourth variation may include a module as set forth in the first through third variations wherein the body may also include a door wherein the door may allow a user to access the at least one cavity.

A fifth variation may include a module as set forth in the first through fourth variations wherein the body may include a hitch. The hitch may allow a user to hitch the module to the hitch ball of a vehicle so that the module may be towed by a vehicle.

A sixth variation may include a module as set forth in the first through fifth variations wherein the body may include a platform. The platform may allow a user to stand or sit on a surface of the platform and access or utilize the control arm.

A seventh variation may include a module as set forth in the first through sixth variations wherein the control arm may include an arm portion and a handle portion. The arm portion may hinge from the body and extend outwardly therefrom or may be hinged to abut a portion of the body.

An eighth variation may include a module as set forth in the first through seventh variations wherein the handle may include a control means. The control means may allow a user to control or drive the movement of the module. The control means may be integrated with the motor, battery, and plurality of wheels so that the control means may be used to control or drive the movement of the module.

A ninth variation may include a module as set forth in the first through eighth variations wherein the control means may be cylindrical in shape and the control means may be constructed and arranged such that when a user rotates the control means about a longitudinal axis of the control means, the control means may drive the module forward or backward with respect to the user and when a user twists the control means clockwise or counter-clockwise about a polar axis of the control means, the control means may drive the module to the left or to the right of the user. Alternative means of physically controlling the control means may be contemplated and are understood to be included in the means of operation of the control means.

A tenth variation may include a module that may have a body and a plurality of wheels. The body may have a first side wall, a second side wall, a front wall, a rear wall, a floor, a roof, at least one cavity, a door, a motor, a battery, or a control arm. The at least one cavity may function to contain cargo or freight and the door may function to allow a user to access the at least one cavity. The motor and battery may be integrated with the plurality of wheels such that the motor and battery may power movement control of the plurality of wheels. The control arm may include a control means, the control means may be used by a user to drive the motor, battery, or plurality of wheels such that the control means facilitates ease of mobility and navigability of the module over terrain or surfaces.

An eleventh variation may include a module as set forth in the tenth variation wherein the body may include a hitch. The hitch may allow a user to hitch the module to the hitch ball of a vehicle so that the module may be towed by a vehicle.

A twelfth variation may include a module as set forth in the tenth and eleventh variations wherein the body may include a platform. The platform may allow a user to stand or sit on a surface of the platform and access or utilize the control arm.

A thirteenth variation may include a module as set forth in the tenth through twelfth variations wherein the control arm may include an arm portion and a handle portion. The arm portion may hinge from the body and extend outwardly therefrom or may be hinged to abut a portion of the body.

A fourteenth variation may include a module as set forth in the tenth through thirteenth variations wherein the control means may be cylindrical in shape and the control means may be constructed and arranged such that when a user rotates the control means about a longitudinal axis of the control means, the control means may drive the module forward or backward with respect to the user and when a user twists the control means clockwise or counter-clockwise about a polar axis of the control means, the control means may drive the module to the left or to the right of the user. Alternative means of physically controlling the control means may be contemplated and are understood to be included in the means of operation of the control means.

A fifteenth variation may include a method including providing a module, the module may include a body and a plurality of wheels. The body may include a first side wall, a second side wall, a front wall, a rear wall, a floor, a roof, at least one cavity, a door, a motor, a battery, or a control arm. The at least one cavity may function to contain cargo or freight. The door may function to allow a user to access the at least one cavity. The motor and battery may be integrated with the plurality of wheels such that the motor and battery may power movement of the plurality of wheels. The control arm may include a control means, the control means may be constructed and arranged to drive the motor, battery, and plurality of wheels such that the control means facilitates ease of mobility and navigability of the module over terrain or surfaces. A user may control movement of the module via the control means.

A sixteenth variation may include a method as set forth in the fifteenth variation wherein a user may control the movement of the module via a hand-led mode of operation. The user may use the control means to steer, direct, or otherwise control the movements of the module using the control means from a walking or standing position on the ground.

A seventeenth variation may include a method as set forth in the fifteenth variation wherein the user may control movement of the module via a driving mode of operation. The user may putt the platform in a position about or near parallel to the ground and stand or sit on the platform. From a standing or sitting position on the platform, the user may reach and use the control means to steer, direct, or otherwise control the movements of the module via the control means.

An eighteenth variation may include a method as set forth in the fifteenth variation wherein the user may control movement of the module via a towing mode of operation. The user may move the hitch into a position about or near parallel to the ground, temporarily attach the hitch to a hitch ball of a vehicle, and may use the vehicle to tow and steer, direct, or otherwise control the movements of the module.

A nineteenth variation may include a method wherein the movement of the module may be controlled via an autonomous mode of operation. The body may include a computer controller and the computer controller may include hardware and software integrated with the battery, motor, and plurality of wheels such that the computer controller may steer, direct, or otherwise control the movements of the module.

A twentieth variation may include a method as set forth in the fifteenth through nineteenth variations wherein a module or multiple modules may be loaded into a vehicle wherein a user may move or direct the module or modules into the vehicle and the vehicle may transport multiple modules.

The above description of variations of the invention is merely demonstrative in nature and, thus, variations thereof are not to be regarded as a departure from the spirit and scope of the inventions disclosed within this document.

What is claimed is:

1. A product comprising:
   a module comprising a body, a control arm, and a plurality of wheels;
   the body defining at least one cargo space and comprises a hitch, the hitch being constructed and arranged such that the hitch may engage a hitch ball of a vehicle so that the module may be towed by the vehicle,
   the at least one cargo space being constructed and arranged to hold cargo or freight; and
   the control arm being constructed and arranged to facilitate ease of mobility and navigability of the module over terrain or surfaces.

2. A product as set forth in claim 1 wherein the body further comprises a motor and a battery constructed and arranged to drive the plurality of wheels.

3. A product as set forth in claim 2 wherein the control arm is integrated with the motor, the battery, and the plurality of wheels;
   the module being constructed and arranged to facilitate ease of mobility and navigability of the module over rough terrain or rough surfaces.

4. A product as set forth in claim 1 wherein the body further comprises a door, the door being constructed and arranged to allow a user to access the at least one cavity.

5. A product as set forth in claim 1 wherein the body further comprises a platform, the platform being constructed and arranged such that a user may stand or sit on the platform and be able to utilize the control arm.

6. A product as set forth in claim 1 wherein the control arm comprises an arm portion and a handle portion; the arm portion being constructed and arranged to hinge from the body and extend outwardly therefrom.

7. A product as set forth in claim 6 wherein the handle portion comprises a control means; the control means being constructed and arranged to allow a user to control or drive the movement of the module.

8. A product as set forth in claim 7 wherein the control means is cylindrical in shape; the control means being constructed and arranged such that when a user rotates the control means about a longitudinal axis of the control means, the control means drives the module forward or backward with respect to the user and when a user twists the control means clockwise or counter-clockwise about a polar axis of the control means, the control means drives the module to the left or to the right of the user.

9. A product comprising:
   a module comprising a body and a plurality of wheels;
   the body comprising a first side wall, a second side wall, a front wall, a rear wall, a floor, and a roof connected together and defining at least one cargo space, a door, a battery, a motor and a control arm operatively connected together, and wherein the body further comprises a hitch being constructed and arranged such that the hitch may engage a hitch ball of a vehicle so that the module may be towed by the vehicle;
   the at least one cargo space being constructed and arranged to contain cargo or freight;
   the door being constructed and arranged to allow a user to access the at least one cavity;
   the motor and battery being integrated with the plurality of wheels such that the motor and battery power movement of the plurality of wheels; and
   the control arm comprising a control means; the control means being constructed and arranged to drive the motor, battery, and plurality of wheels such that the control means facilitates ease of mobility and navigability of the module over terrain or surfaces.

10. A product comprising:
    a module comprising a body and a plurality of wheels;
    the body comprising a first side wall, a second side wall, a front wall, a rear wall, a floor, and a roof connected together and defining at least one cargo space, a door, a battery, a motor and a control arm operatively connected together;
    the at least one cargo space being constructed and arranged to contain cargo or freight;
    the door being constructed and arranged to allow a user to access the at least one cavity;
    the motor and battery being integrated with the plurality of wheels such that the motor and battery power movement of the plurality of wheels; and
    the control arm comprising a control means; the control means being constructed and arranged to drive the motor, battery, and plurality of wheels such that the control means facilitates ease of mobility and navigability of the module over terrain or surfaces, and wherein the body further comprises a platform; the platform being constructed and arranged such that a user may stand or sit on the platform and be able to utilize the control arm.

11. A product as set forth in claim 9 wherein the control arm comprises an arm portion and a handle portion; the arm portion being constructed and arranged to hinge from the body and extend outwardly therefrom.

12. A product as set forth in claim 9 wherein the control means is constructed and arranged such that when a user rotates the control means about a longitudinal axis of the control means, the control means drives the module forward or backward with respect to the user and when a user twists the control means clockwise or counter-clockwise about a polar axis of the control means, the control means drives the module to the left or to the right of the user.

13. A method comprising:
    providing a module comprising a body and a plurality of wheels;
    the body comprising a first side wall, a second side wall, a front wall, a rear wall, a floor, a roof connected together and defining at least one cargo space, a door, a battery, a motor and a control arm operatively connected together;
    the at least one cargo space being constructed and arranged to contain cargo or freight;
    the door being constructed and arranged to allow a user to access the at least one cavity;
    the motor and battery being integrated with the plurality of wheels such that the motor and battery power movement of the plurality of wheels;
    the control arm comprising a control means, the control means being constructed and arranged to drive the motor, battery, and plurality of wheels such that the control means facilitates ease of mobility and navigability of the module over rough terrain or rough surfaces; and
    moving the module via the control means.

14. The method of claim 13 wherein the moving comprises controlling the module via a hand-led mode of operation comprising the user using the control means to steer, direct, or otherwise control the movements of the module using the control means from a standing or walking position on the ground.

15. The method of claim 13 wherein the moving comprises controlling the module via a driving mode of operation comprising the user putting the platform in a position about or near parallel to the ground, standing on the platform, and using the control means to steer, direct, or otherwise control the movements of the module using the control means.

16. The method of claim 13 wherein the moving comprises controlling the module via a towing mode of operation comprising the user moving the hitch into a position about or near parallel to the ground, temporarily attaching the hitch to a hitch ball of a vehicle, and using the vehicle to steer, direct, or otherwise control the movements of the module.

17. The method of claim 13 wherein the moving comprises controlling the module via an autonomous mode of operation wherein the body further comprises a computer controller; the computer controller comprising hardware and software; the computer controller being integrated with the battery, motor, and plurality of wheels such that the computer controller steers, directs, or otherwise controls the movements of the module.

18. The method of claim 13 further comprising loading a module or multiple modules into a vehicle wherein a user moves or directs the module into the vehicle.

* * * * *